(12) United States Patent
Akiyama

(10) Patent No.: US 11,117,438 B2
(45) Date of Patent: Sep. 14, 2021

(54) DOOR ACTUATING DEVICE

(71) Applicant: Keihin Corporation, Tokyo (JP)

(72) Inventor: Shingo Akiyama, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 70 days.

(21) Appl. No.: 16/444,062

(22) Filed: Jun. 18, 2019

(65) Prior Publication Data

US 2020/0001679 A1  Jan. 2, 2020

(30) Foreign Application Priority Data

Jun. 29, 2018  (JP) .............................. JP2018-124483

(51) Int. Cl.
*B60H 1/00* (2006.01)

(52) U.S. Cl.
CPC ....... *B60H 1/0005* (2013.01); *B60H 1/00692* (2013.01); *B60H 1/00857* (2013.01); *B60H 1/00421* (2013.01); *B60H 2001/00078* (2013.01); *B60H 2001/00092* (2013.01)

(58) Field of Classification Search
CPC ............ B60H 1/00692; B60H 1/00857; B60H 1/00421; B60H 2001/0092; B60H 1/0005; B60H 1/00507; B60H 1/00642; B60H 1/00662; B60H 1/00835; B60H 1/00864; B60H 2001/00078; B60H 2001/00092; B60H 2001/3471; F24F 13/10
USPC .......................................... 454/313; 251/250
See application file for complete search history.

(56) References Cited

U.S. PATENT DOCUMENTS

| | | | | |
|---|---|---|---|---|
| 1,724,990 A | * | 8/1929 | Bovey ................ | B60H 1/00857 74/503 |
| 3,847,210 A | * | 11/1974 | Wells .................. | F24F 13/1426 165/103 |
| 4,226,138 A | * | 10/1980 | Ha-Pham ........... | B60H 1/00857 74/471 R |
| 4,506,825 A | * | 3/1985 | Grant ..................... | F24F 13/15 137/601.09 |
| 4,656,877 A | * | 4/1987 | Hildebrand .......... | B60H 1/0065 74/68 |
| 5,370,578 A | * | 12/1994 | Yi ........................... | F24F 13/26 454/305 |
| 6,062,298 A | * | 5/2000 | Lee ..................... | B60H 1/00664 165/42 |
| 6,099,405 A | * | 8/2000 | Cunningham, Jr. .. | F24F 13/075 137/601.09 |

(Continued)

FOREIGN PATENT DOCUMENTS

JP  2004-203064 A  7/2004

*Primary Examiner* — Steven B McAllister
*Assistant Examiner* — Mark P Yost
(74) *Attorney, Agent, or Firm* — Westerman, Hattori, Daniels & Adrian, LLP

(57) ABSTRACT

A door actuating device includes a plurality of doors disposed in a flow channel for adjusting a degree of opening of the flow channel defined in an air conditioner case, the doors having respective door drive shafts, and a link unit actuating at least two of the doors. The link unit includes an actuator, a plate-like base member having two surfaces, a link mechanism having a plurality of levers mounted on at least either one of the two surfaces of the base member, and a rack member movably disposed on the base member and movable by a drive force transmitted from the actuator.

7 Claims, 4 Drawing Sheets

(56) References Cited

U.S. PATENT DOCUMENTS

| | | | | |
|---|---|---|---|---|
| 6,237,630 | B1* | 5/2001 | Stone | F16K 17/383 |
| | | | | 137/601.12 |
| 6,270,400 | B1* | 8/2001 | Tsurushima | B60H 1/00692 |
| | | | | 454/121 |
| 6,814,137 | B2* | 11/2004 | Tsurushima | B60H 1/00064 |
| | | | | 165/103 |
| 6,955,338 | B2* | 10/2005 | Okumura | B60H 1/00692 |
| | | | | 251/249.5 |
| 9,763,518 | B2* | 9/2017 | Charest | H05K 7/1421 |
| 10,272,740 | B2* | 4/2019 | Mazzocco | B60H 1/00857 |
| 2003/0232590 | A1* | 12/2003 | Okumura et al. | B60H 1/00692 |
| 2007/0111651 | A1* | 5/2007 | Sekito | B60H 1/00692 |
| | | | | 454/121 |
| 2009/0264063 | A1* | 10/2009 | Tinsley | A61K 31/352 |
| | | | | 454/324 |
| 2019/0315191 | A1* | 10/2019 | Kang | B60H 1/00857 |
| 2020/0307350 | A1* | 10/2020 | Akiyama | B60H 1/00692 |

\* cited by examiner

DOOR ACTUATING DEVICE

CROSS REFERENCE TO RELATED APPLICATION

The present application claims priority under 35 U.S.C. § 119 to Japanese Patent Application No. 2018-124483 filed in the Japan Patent Office on Jun. 29, 2018, the entire content of which is hereby incorporated by reference.

TECHNICAL FIELD

The present disclosure relates to a door actuating device for transmitting an actuating force from an actuator to a plurality of doors of a vehicular air-conditioning apparatus to selectively open and close the doors.

BACKGROUND

Heretofore, there has been proposed a vehicular air-conditioning apparatus having a plurality of doors disposed in an air conditioner case and a door actuating device for transmitting an actuating force from an actuator to the doors thereby to move the doors to switch between states in which air flows through flow channels.

As disclosed in Japanese patent laid-open publication No. 2004-203064 ("JP '064"), such a door actuating device has a casing disposed on a side surface of an air conditioner unit and a link mechanism housed in the casing for actuating a plurality of doors. The link mechanism includes a drive lever directly actuated by a drive motor and first and second driven levers held in engagement with the drive lever through intermediate rods and angularly movable by the drive lever. The first driven lever has an end portion projecting out of the casing and coupled to a drive shaft of an air mixing door, and the second driven lever has an end portion projecting out of the casing and coupled to a drive shaft of a rear face door.

According to the door actuating device disclosed in JP 064, as the distances between the doors including the air mixing door and the rear face door and the drive motor increase, the levers including the drive lever and the first and second driven levers tend to have increased radii of rotation, and move along increased trajectories when they are angularly moved. Therefore, the disclosed door actuating device is problematic in that the link mechanism is likely to be larger in size by the increases in the trajectories along which the levers move when they are angularly moved.

Furthermore, since the drive lever and the first and second driven levers are stored between upper and lower cases that make up the casing, the door actuating device that includes the casing is liable to increase in weight and cannot easily be assembled.

SUMMARY

Thus, it is preferable to provide a door actuating device which is of a simplified structure, is small in size and weight, and can easily be assembled.

One embodiment provides a door actuating device including a plurality of doors disposed in a flow channel for adjusting a degree of opening of the flow channel defined in an air conditioner case, the doors having respective door drive shafts, and a link unit actuating at least two of the doors. The link unit includes an actuator, a plate-like base member having two surfaces, a link mechanism having a plurality of levers mounted on at least either one of the two surfaces of the base member, and a rack member movably disposed on the base member and movable by a drive force transmitted from the actuator.

According to the one embodiment, the door actuating device for adjusting the degree of opening of the flow channel defined in the air conditioner case includes the actuator, the plate-like base member having the two surfaces, the link mechanism having the levers mounted on at least either one of the two surfaces of the base member, and the rack member movably disposed on the base member and movable by the drive force transmitted from the actuator. The drive force from the actuator is transmitted through the rack member to the doors.

The link unit including the levers can be installed as a module on the air conditioner case. The module can more easily be assembled than if the levers and the rack members are separately assembled on the air conditioner case. Since the levers are mounted on the single base member, the door actuating device is made up of a smaller number of parts and is smaller in weight than with the conventional door actuating device in which the levers are stored between two upper and lower cases of a casing of the door actuating device.

Inasmuch as the drive force from the actuator is transmitted through the rack member to the doors, the levers can move along more compact trajectories and hence the door actuating device can be smaller in size than the conventional door actuating device in which the drive force from an actuator is transmitted to door drive shafts by only levers including drive and driven levers.

As a result, inasmuch as the door actuating device is of a simpler structure, it can be made up of a smaller number of parts, is smaller in size and weight, and can more easily be assembled than the conventional door actuating device.

Moreover, the link unit of the door actuating device that includes the levers can be installed as a module on the air conditioner case. The module can more easily be assembled than if the levers and the rack members are separately assembled on the air conditioner case. Since the levers are mounted on the single base member, the number of parts of the door actuating device is reduced.

BRIEF DESCRIPTION OF THE DRAWINGS

The advantages of this disclosure will become apparent in the following description taken in conjunction with the drawings, wherein.

DETAILED DESCRIPTION

Figure 1:
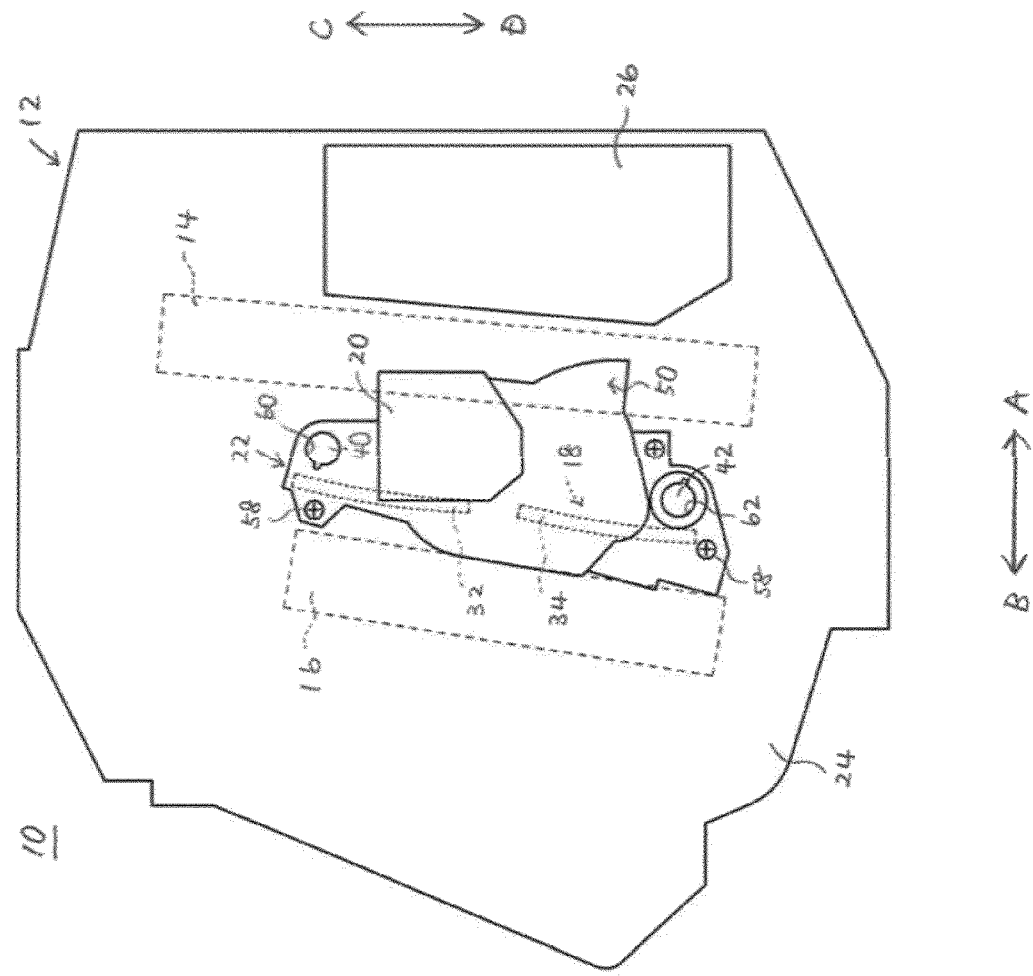
FIG. 1 is a front elevational view of a vehicular air-conditioning apparatus incorporating a door actuating device according to an embodiment of the present disclosure.

A door actuating device according to one embodiment of the present disclosure will be described in detail below with reference to the accompanying drawings. In FIG. 1, the door actuating device according to the present embodiment is incorporated in a vehicular air-conditioning apparatus 10.

The door actuating device includes a pair of assemblies mounted respectively on opposite transverse side walls of an air conditioner case. However, since those assemblies are identical in structure, only one of them will be illustrated and described in detail in the embodiment below.

As illustrated in FIG. 1, the vehicular air-conditioning apparatus 10 includes an air conditioner case 12 that defines air passageways or flow channels therein, an evaporator 14 disposed in the air conditioner case 12 for cooling air, a heater core 16 for heating air, an air-mixing mechanism 18 for mixing cool air and hot air that have been temperature-regulated in the air conditioner case 12 at a predetermined mixing ratio to produce mixed air, and a door actuating mechanism or door actuating device 22 mounted on a side surface of the air conditioner case 12 for transmitting a drive force from an actuator 20 to the air-mixing mechanism 18 to actuate the air-mixing mechanism 18.

The vehicular air-conditioning apparatus 10 illustrated in FIG. 1 has a right side, which faces in the direction indicated by an arrow A, oriented in the forward direction of a vehicle that incorporates the vehicular air-conditioning apparatus 10 and a left side, which faces in the direction indicated by an arrow B, oriented in the rearward direction of the vehicle. The direction indicated by the arrow A will hereinafter also be referred to as the forward direction of the vehicle, and the direction indicated by the arrow B as the rearward direction of the vehicle.

The air conditioner case 12 has an air inlet port 26 defined in a transverse side wall 24 thereof at a foremost position thereon in the forward direction of the vehicle. Air from an air blower, not depicted, is introduced through the air inlet port 26 into the air conditioner case 12. The transverse side wall 24 has two shaft holes 28a and 28b (see FIG. 3) defined therein. First and second shafts or door drive shafts 40 and 42 have respective ends inserted respectively in the shaft holes 28a and 28b to be described later.

Figure 2:
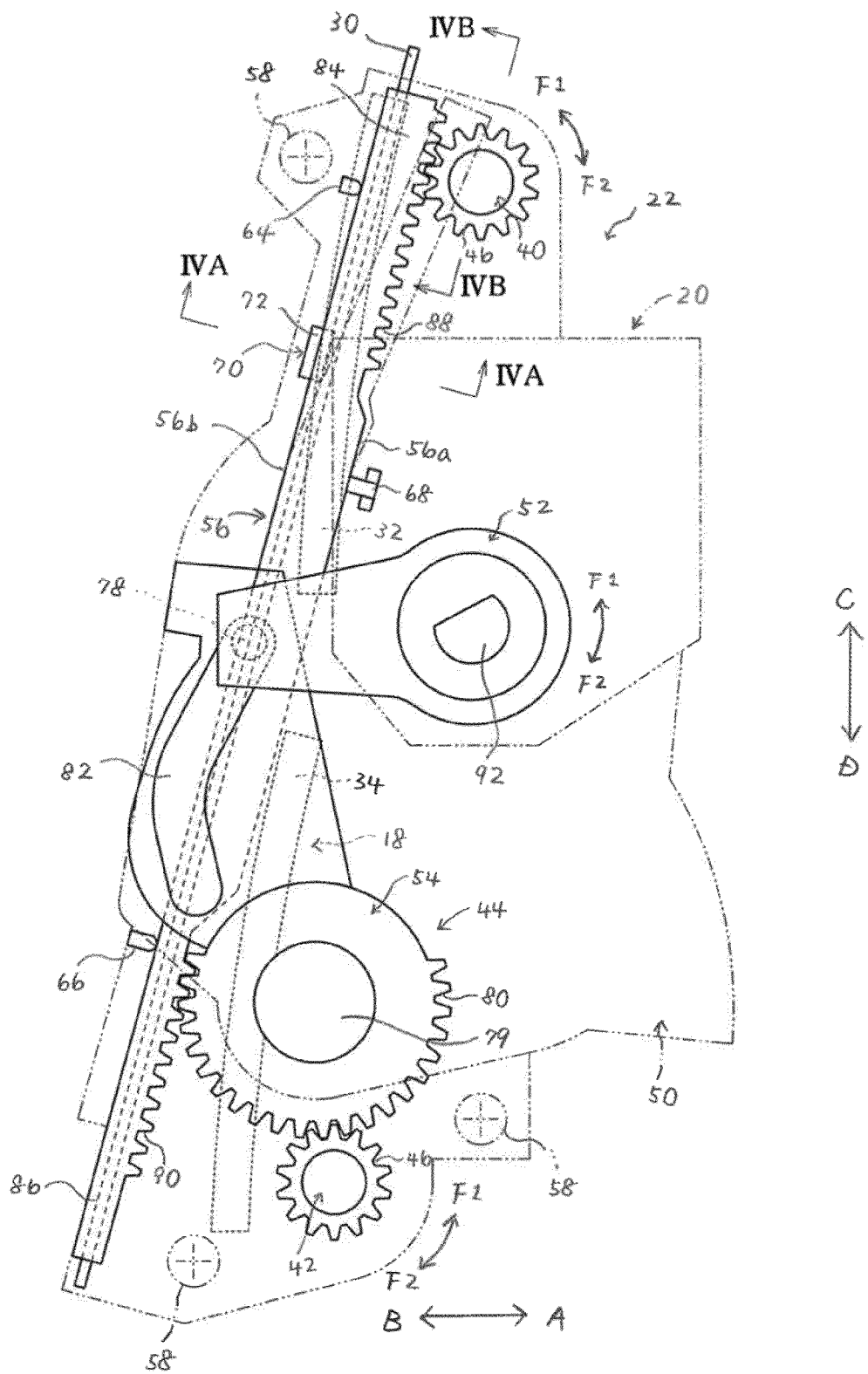
FIG. 2 is an enlarged front elevational view, partly omitted from illustration, of the door actuating device illustrated in FIG. 1.

As illustrated in FIGS. 2 through 4B, a vertically extending guide rail 30 is disposed on the transverse side wall 24 at a position behind the shaft holes 28a and 28b in the rearward direction of the vehicle, i.e., in the direction indicated by the arrow B. The guide rail 30 projects to a certain height transversely outwardly from the transverse side wall 24 and extends straight vertically. The door actuating mechanism 22 includes a rack member 56, to be described later, movably supported on the guide rail 30. As illustrated in FIG. 2, the guide rail 30 is disposed in a position on the air conditioner case 12 that faces the rack member 56 of the door actuating mechanism 22.

As illustrated in FIG. 1, the air conditioner case 12 houses therein the evaporator 14 disposed behind the air inlet port 26 in the rearward direction of the vehicle, i.e., in the direction indicated by the arrow B. The air conditioner case 12 also houses therein the heater core 16 disposed behind the evaporator 14 in the rearward direction of the vehicle, i.e., in the direction indicated by the arrow B. The air-mixing mechanism 18 that adjusts the rate and state of air introduced from the air inlet port 26 as it flows downstream is disposed between the evaporator 14 and the heater core 16.

Figure 3:
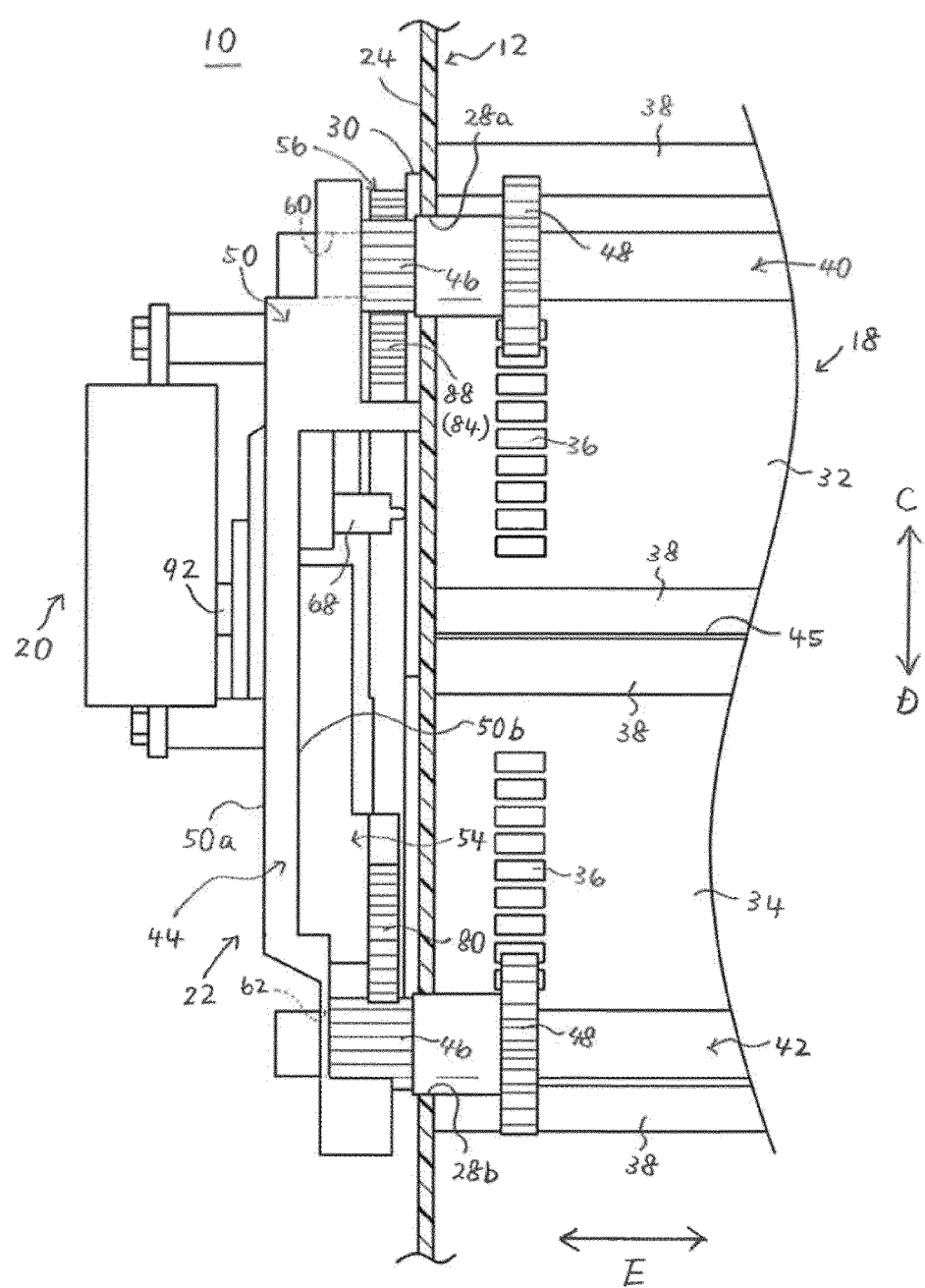
FIG. 3 is an enlarged side elevational view of the door actuating device illustrated in FIG. 2.

As illustrated in FIGS. 1 through 3, the air mixing mechanism 18 includes a first air mixing door 32 extending upwardly in the direction indicated by an arrow C and a second air mixing door 34 extending downwardly of the first air mixing door 32 in the direction indicated by an arrow D.

The first and second air mixing doors 32 and 34 are in the form of plates having an arcuate cross-sectional shape and extend transversely across the air conditioner case 12 in the directions indicated by an arrow E in FIG. 3. The first and second air mixing doors 32 and 34 are vertically movably guided by guides, not depicted, on transverse inner wall surfaces of the air conditioner case 12 for vertical movement in the directions indicated by the arrows C and D.

The first and second air mixing doors 32 and 34 have rack gears 36 (see FIG. 3) on their respective concave surfaces that face the evaporator 14 in the forward direction of the vehicle. The rack gears 36 are disposed on respective transverse end portions of the first and second air mixing doors 32 and 34 and extend vertically in the directions indicated by the arrows C and D. The rack gears 36 are held in mesh with respective gears 48, to be described later, on the first and second shafts 40 and 42.

Seal members 38 that extend transversely in the directions indicated by the arrow E are mounted on the opposite ends of the first and second air mixing doors 32 and 34 along the directions in which the first and second air mixing doors 32 and 34 are movable. Each of the seal members 38 is made of a compressible elastic material such as urethane or the like and is of a rectangular cross-sectional shape. As the first and second air mixing doors 32 and 34 move along the guides, the seal members 38 abut against walls, not depicted, of the air conditioner case 12 to seal any gaps therebetween.

The door actuating mechanism 22 includes the first and second shafts 40 and 42 that are rotatably disposed in the air conditioner case 12 for actuating the first and second air mixing doors 32 and 34, respectively, and a link mechanism or link unit 44 mounted on the transverse side wall 24 for transmitting a drive force from the actuator 20 to the first and second shafts 40 and 42. Although only one link mechanism 44 is illustrated in FIGS. 1 through 3, there are actually a pair of link mechanisms 44 mounted respectively on opposite transverse side walls 24 of the air conditioner case 12.

As illustrated in FIGS. 2 through 4B, the first and second shafts 40 and 42 are rotatably supported by the air conditioner case 12 with their axially opposite ends, which are spaced in the directions indicated by the arrow E, inserted in respective shaft holes 28a and 28b defined in the opposite transverse side walls 24 of the air conditioner case 12. The first shaft 40 is disposed in facing relation to a forward portion of the first air mixing door 32 in the forward direction of the vehicle, i.e., in the direction indicated by the arrow A. The second shaft 42 is disposed in facing relation to a forward portion of the second air mixing door 34 in the forward direction of the vehicle, i.e., in the direction indicated by the arrow A. The first and second shafts 40 and 42 are spaced a predetermined gap from each other vertically in the directions indicated by the arrows C and D with a spacer wall 45 interposed between, and extend parallel to each other.

The first and second shafts 40 and 42 have first gears or toothed portions 46 disposed on the axially opposite end portions thereof near the opposite transverse side walls 24 of the air conditioner case 12 and second gears 48 disposed thereon more axially closer than the first gears 46 to the axial centers of the first and second shafts 40 and 42. The second gears 48 are held in mesh with the respective rack gears 36 of the first and second air mixing doors 32 and 34.

The link mechanism 44 includes a base member 50 mounted on an outer surface of the transverse side wall 24 of the air conditioner case 12, a drive lever 52 disposed on an outer surface 50a of the base member 50 and angularly movable by the drive force from the actuator 20, a driven lever 54 engaged by the drive lever 52 and movable upon angular movement of the drive lever 52, and a rack member 56 held in mesh with a link gear 80, to be described later, of the driven lever 54 and linearly movable along its own axis.

The base member 50 is in the form of a plate that is elongate in the vertical directions, i.e., in the directions indicated by the arrows C and D. The base member 50 is spaced a certain distance from and lies substantially parallel to the transverse side wall 24 of the air conditioner case 12 (see FIG. 3). The base member 50 has its upper and lower end portions fastened to the transverse side wall 24 by a plurality of fastening bolts 58 (see FIG. 2).

The base member 50 has a first shaft hole or insertion hole 60 defined therein in the vicinity of the upper end portion thereof, and the first shaft 40 has its end inserted in the first shaft hole 60. The base member 50 also has a second shaft hole or insertion hole 62 defined therein in the vicinity of the upper end portion thereof, and the second shaft 42 has its end inserted in the second shaft hole 62. The first and second shaft holes 60 and 62 are defined in the base member 50 at such positions that when the door actuating mechanism 22 is secured to the air conditioner case 12, the first and second shaft holes 60 and 62 are kept in line with the shaft holes 28a and 28b, respectively.

Figure 4A:
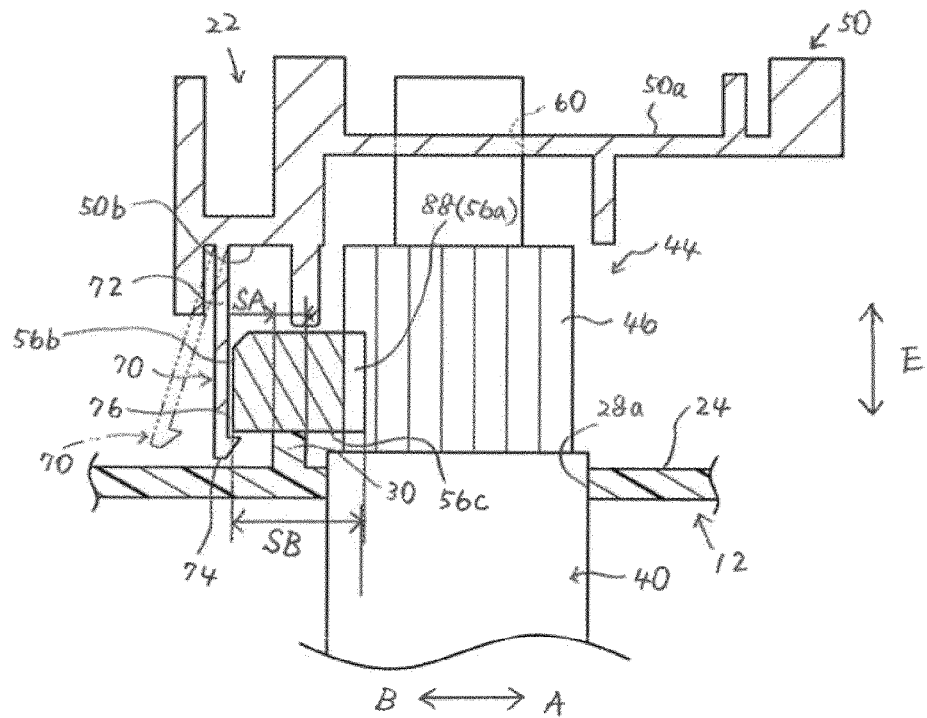
FIG. 4A is a cross-sectional view taken along line IVA-IVA of FIG. 2.

As illustrated in FIGS. 2 and 4A, the base member 50 has two first pressers 64, 66, and a second presser 68 and a hook 70 that are erected from an inner surface 50b thereof which faces the air conditioner case 12.

The first and second pressers 64, 66, and 68 protrude substantially perpendicularly from the inner surface 50b of the base member 50. The two first pressers 64 and 66 are held in line with each other along the directions in which the rack member 56 is movable, and are positioned behind the rack member 56 in the rearward direction of the vehicle, i.e., in the direction indicated by the arrow B. The second presser 68 is positioned in front of the rack member 56 in the forward direction of the vehicle, i.e., in the direction indicated by the arrow A.

The two first pressers 64 and 66 abut against a rear surface 56b of the rack member 56. The second presser 68 is positioned between the two first pressers 64 and 66 on a front surface 56a of the rack member 56, which is opposite the rear surface 56b thereof, and abuts against the front surface 56a of the rack member 56. The first and second pressers 64, 66, and 68 are erected to substantially the same height as each other from an inner surface 50b of the base member 50.

As with the two first pressers 64 and 66, the hook 70 is positioned behind the rack member 56 in the rearward direction of the vehicle, i.e., in the direction indicated by the arrow B. The hook 70 is disposed between the two first pressers 64 and 66 and held in line with the two first pressers 64 and 66 along the directions in which the rack member 56 is movable.

The hook 70 is disposed between the second presser 68 and the end of a first rod 84, to be described later, of the rack member 56 in the longitudinal directions of the rack member 56.

As illustrated in FIGS. 2 and 4A, the hook 70, which is made of an elastically deformable resin material, for example, includes a leg 72 extending substantially perpendicularly from the inner surface 50b of the base member 50 and a prong 74 disposed on the distal end of the leg 72. The leg 72 is in the form of a thin plate extending substantially parallel to the directions in which the rack member 56 is movable. The leg 72 protrudes to a predetermined height from the base member 50.

As illustrated in FIG. 4A, the prong 74 protrudes forwardly from the leg 72 toward the rack member 56 in the forward direction of the vehicle. The prong 74 has an end face 76 extending toward the base member 50, i.e., the rack member 56, as a flat surface substantially perpendicular to the leg 72. The prong 74 is of a triangular cross-sectional shape whose slanted side is progressively tapered off away from the end face 76.

The hook 70 is flexible in the forward and rearward directions of the vehicle about the end of the leg 72 that is joined to the inner surface 50b of the base member 50, as indicated by the two-dot-and-dash lines in FIG. 4A. Stated otherwise, the hook 70 is elastically deformable in the directions toward and away from the rack member 56 that is positioned forwardly of the hook 70 in the forward direction of the vehicle.

As illustrated in FIG. 2, the drive lever 52 has an end centrally coupled to a drive shaft 92 of the actuator 20 and another end portion extending straight from the end. A link pin 78 projects perpendicularly to the directions in which the drive lever 52 extends. The link pin 78 extends substantially parallel to the drive shaft 92 of the actuator 20 and is disposed near the transverse side wall 24 of the air conditioner case 12.

The drive lever 52 is disposed substantially centrally on the base member 50. The other end portion of the drive lever 52 which has the link pin 78 is angularly moved through a predetermined angle about the end coupled to the drive shaft 92 at the time the actuator 20 is in operation.

The driven lever 54 is disposed on the inner surface 50b of the base member 50 and has an end rotatably supported on a support 79 disposed on the base member 50 in the vicinity of the lower end thereof. The driven lever 54 has a link gear or a toothed portion 80 having a plurality of gear teeth formed along an outer circumferential surface thereof. The link gear 80 is held in mesh with the first gear 46 of the second shaft 42 and also with a second rod gear or toothed rod portion 90, to be described later, of the rack member 56.

The driven lever 54 has a link groove 82 defined in a surface thereof and extending from one end to other of the driven lever 54. The link pin 78 on the drive lever 52 that is disposed adjacent to the driven lever 54 is inserted in the link groove 82. When the drive lever 52 is angularly moved, the driven lever 54 has its other end portion angularly moved through the link pin 78 engaging in the link groove 82.

The rack member 56 is made of an elastically deformable resin material, for example. As illustrated in FIGS. 2 through 4B, the rack member 56 is disposed between the inner surface 50b of the base member 50 and the transverse side wall 24 of the air conditioner case 12. The rack member 56 is disposed rearwardly of the first and second shafts 40 and 42 in the rearward direction of the vehicle, i.e., in the direction indicated by the arrow B. The rack member 56 is guided by the guide rail 30 on the transverse side wall 24 for movement along the guide rail 30.

The rack member 56 has a first rod 84 extending along its longitudinal directions and disposed on an end portion thereof in facing relation to the first shaft 40 and a second rod 86 along its longitudinal directions and disposed on another end portion thereof in facing relation to the second shaft 42. The first rod 84 has a first rod gear or toothed rod portion 88 extending along the front surface 56a thereof that face the first shaft 40 in the direction indicated by the arrow A and held in mesh with the first gear 46 of the first shaft 40.

The second rod 86 has a second rod gear or toothed rod portion 90 extending along the front surface 56a thereof that faces the second shaft 42 in the direction indicated by the arrow A and held in mesh with the link gear 80 of the driven lever 54. The second presser 68 is held in abutment against the front surface 56a of the rack member 56 at a position between the first rod gear 88 and the second rod gear 90. The front surface 56a of the rack member 56 is movably supported by the second presser 68.

The rear surface 56b of the rack member 56, which is opposite the front surface 56a that has the first and second rod gears 88 and 90, is in the form of a substantially straight flat surface. The two first pressers 64 and 66 of the base member 50 are held in abutment against the rear surface 56b of the rack member 56, which is movably supported by the two first pressers 64 and 66. The leg 72 of the hook 70 is disposed in facing relation to the rear surface 56b of the rack member 56.

As illustrated in FIG. 2, the first presser 64 is positioned across the first rod gear 88 of the rack member 56 from the first shaft 40, and the other first presser 66 is positioned across the second rod gear 90 of the rack member 56 from the link gear 80 of the driven lever 54.

Figure 4B:
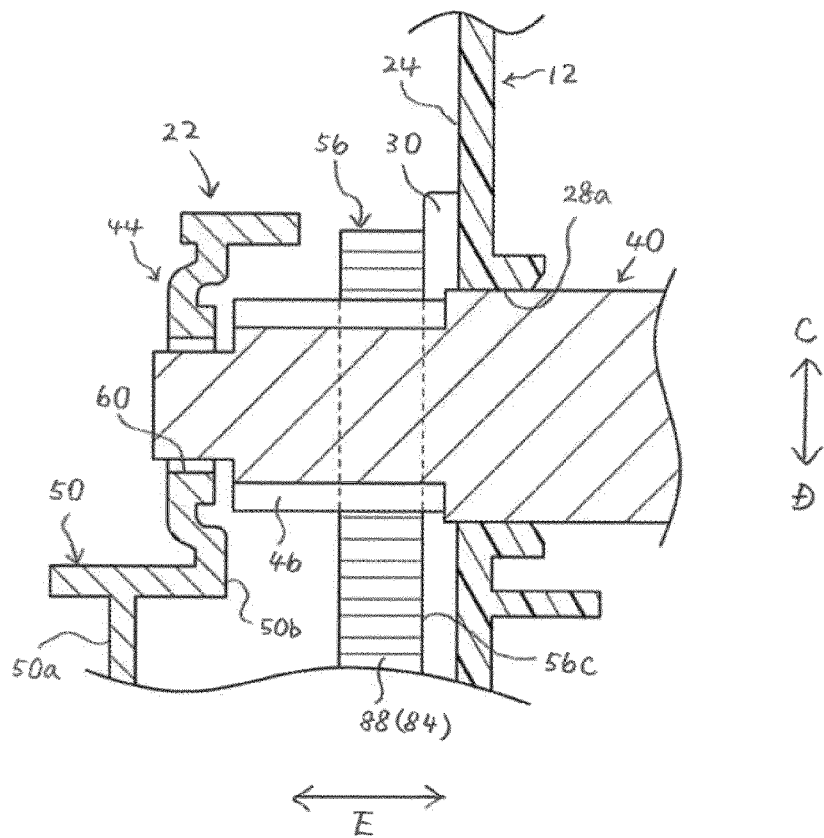
FIG. 4B is a cross-sectional view taken along line IVB-IVB of FIG. 2.

As illustrated in FIGS. 4A and 4B, the rack member 56 has a side surface 56c near the air conditioner case 12. The side surface 56c can abut against the guide rail 30 on the air conditioner case 12. The prong 74 of the hook 70 is disposed in covering relation to a portion of the side surface 56c when the hook 70 is not flexed.

As illustrated in FIGS. 1 through 3, the actuator 20, whose drive shaft 92 is rotatable about its own axis based on a control signal from a controller, is fixedly mounted on the outer surface 50a of the base member 50. The drive shaft 92 has a distal end projecting through a hole, not depicted, defined in the base member 50 toward the air conditioner case 12 and coupled centrally to the end of the drive lever 52.

The vehicular air-conditioning apparatus 10 that incorporates the door actuating mechanism or door actuating device 22 according to the present embodiment is basically constructed as described above. Now, a process of assembling the rack member 56 of the door actuating mechanism 22 onto the base member 50 and assembling the door actuating mechanism 22 onto the air conditioner case 12 will be described below.

First, the drive lever 52 and the actuator 20 are installed on the outer surface 50a of the base member 50 in a given position, and the driven lever 54 is installed on the inner surface 50b of the base member 50 in engagement with the drive lever 52.

Then, the rack member 56 is placed under the inner surface 50b of the base member 50 such that the front surface 56a of the rack member 56 faces the driven lever 54 and the first and second shaft holes 60 and 62, i.e., in the direction indicated by the arrow A, with the second presser 68 abutting against the front surface 56a. At the same time, the rear surface 56b of the rack member 56 at the second rod 86 is placed in abutment against the other first presser 66, with the second rod gear 90 held in mesh with the link gear 80 of the driven lever 54.

The first rod 84 of the rack member 56 is disposed in facing relation to the first shaft hole 60. While the worker, not depicted, is gripping the second rod 86, the worker presses the first rod 84 toward the first shaft hole 60, i.e. in the direction indicated by the arrow A. The first rod 84 is slightly elastically deformed flexibly about the portion of the rack member 56 which abuts against the second presser 68, causing the rear surface 56b at the first rod 84 to move in the forward direction of the vehicle, i.e., in the direction indicated by the arrow A, beyond the distal end of the prong 74 of the hook 70, as indicated by the two-dot-and-dash lines in FIG. 2.

While the first rod 84 remains elastically deformed, the worker displaces the rack member 56 toward the base member 50. The rack member 56 is moved toward the base member 50 with respect to the prong 74 in a heightwise direction of the base member 50, whereupon the worker releases the rack member 56 of the push in the forward direction of the vehicle.

The first rod 84 of the rack member 56 now elastically springs back toward the hook 70 into line with the second rod 86. The rear surface 56b of the rack member 56 at the first rod 84 is now brought into abutment against the first presser 64 and faces the leg 72 of the hook 70, and the side surface 56c of the rack member 56 near the air conditioner case 12 now faces the prong 74 of the hook 70.

As a result, under the inner surface 50b of the base member 50, the rack member 56 is prevented from moving in the forward and rearward directions of the vehicle, i.e., in the directions indicated by the arrows A and B, by the first and second pressers 64, 66, and 68, and is also prevented from moving away from the base member 50 by the prong 74 of the hook 70.

The door actuating mechanism 22 with the drive lever 52, the driven lever 54, and the rack member 56 being temporarily assembled thereon is then assembled onto the transverse side wall 24 of the air conditioner case 12. At this time, since the rack member 56 is held on the base member 50 by the first and second pressers 64, 66, and 68 and the hook 70, the rack member 56 does not come off the base member 50 even though the rack member 56 is not secured to the base member 50 by a jig or the like.

The door actuating mechanism 22 is placed such that the inner surface 50b of the base member 50 faces the air conditioner case 12. Then, the ends of the first and second shafts 40 and 42 that project from the transverse side wall 24 of the air conditioner case 12 are inserted respectively into the first and second shaft holes 60 and 62. As depicted in FIG. 2, the first gear 46 of the first shaft 40 is brought into mesh with the first rod gear 88 of the rack member 56 and the first gear 46 of the second shaft 42 is brought into mesh with the link gear 80 of the driven lever 54.

As illustrated in FIG. 4A, the guide rail 30 on the air conditioner case 12 is disposed in abutment against the side surface 56c of the rack member 56. An area SA in which the side surface 56c contacts the guide rail 30 is smaller than an entire surface area SB of the side surface 56c (SA<SB). In other words, the guide rail 30 is held in contact with part of the side surface 56c of the rack member 56.

Finally, the base member 50 is fastened to the transverse side wall 24 of the air conditioner case 12 by the fastening bolts 58. The process of assembling the door actuating mechanism 22 including the base member 50 onto the air conditioner case 12 is now completed.

Operation of the vehicular air-conditioning apparatus 10 that incorporates the door actuating mechanism or door actuating device 22 thus assembled will be described below.

First, a cooling mode of operation for lowering the temperature in the cabin of the vehicle will be described below.

Based on a control signal from the controller, not depicted, air supplied from the air blower, not depicted, is introduced into the air conditioner case 12 through the air inlet port 26. When the introduced air flows through the evaporator 14, it is cooled to a preset temperature by a heat exchange that takes place in the evaporator 14.

Based on a control signal from the controller, the actuator 20 of the door actuating mechanism 22 is energized to rotate the drive shaft 92 about its own axis in a predetermined direction, turning the drive lever 52 counterclockwise, i.e., in the direction indicated by an arrow F1 in FIG. 2. The link pin 78 on the drive lever 52 moves along the link groove 82, causing the driven lever 54 to start turning counterclockwise about the end thereof. When the driven lever 54 is thus turned, the second shaft 42 is turned clockwise, i.e., in the direction indicated by an arrow F2 in FIG. 2. The rack member 56 is linearly moved downwardly, causing the first shaft 40 to turn counterclockwise, i.e., in the direction indicated by the arrow F1 in FIG. 2.

As a result, as illustrated in FIG. 2, the counterclockwise angular movement of the first shaft 40 in the direction indicated by the arrow F1 lowers the first air mixing door 32, and the clockwise angular movement of the second shaft 42 in the direction indicated by the arrow F2 lifts the second air mixing door 34.

As illustrated in FIG. 3, the seal member 38 on the lower end of the first air mixing door 32 and the seal member 38 on the upper end of the second air mixing door 34 abut against the spacer wall 45, fully closing an area upstream of the heater core 16 in the forward direction of the vehicle with the first and second air mixing doors 32 and 34. As a consequence, the air cooled by the evaporator 14 or cool air does not flow toward the heater core 16, but flows above and below the heater core 16 in bypassing relation thereto. The cool air is then discharged through an air outlet port, not depicted, in the air conditioner case 12 and supplied to a region in the vicinity of the face of an occupant in the cabin of the vehicle.

Next, a heating mode of operation for increasing the temperature in the cabin of the vehicle will be described below. Based on a control signal from the controller, the actuator 20 of the door actuating mechanism 22 is energized to rotate the drive shaft 92 about its own axis in a direction opposite the direction in the cooling mode of operation, turning the drive lever 52 clockwise, i.e., in the direction indicated by the arrow F2 in FIG. 2. The link pin 78 on the driven lever 54 moves along the link groove 82, causing the driven lever 54 to start turning clockwise about the end thereof.

When the driven lever 54 is thus turned, the second shaft 42 is turned counterclockwise, i.e., in the direction indicated by the arrow F1 in FIG. 2. The rack member 56 is linearly moved upwardly, causing the first shaft 40 to turn clockwise, i.e., in the direction indicated by the arrow F2 in FIG. 2. The clockwise angular movement of the first shaft 40 in the direction indicated by the arrow F2 lifts the first air mixing door 32, and the counterclockwise angular movement of the second shaft 42 in the direction indicated by the arrow F1 lowers the second air mixing door 34.

The first and second air mixing doors 32 and 34 are now moved away from each other until the area upstream of the heater core 16 is fully opened, whereupon an area downstream of the evaporator 14 is in fluid communication with the heater core 16. The air cooled by the evaporator 14 or cool air flows through the space between the first and second air mixing doors 32 and 34 toward the heater core 16. The cool air thus supplied to the heater core 16 is heated into hot air, which is then discharged through the air outlet port, not depicted, supplied to a region in the vicinity of the feet of the occupant in the cabin of the vehicle.

According to the present embodiment, as described above, the door actuating mechanism 22 that actuates the first and second air mixing doors 32 and 34 has the actuator 20, the plate-like base member 50 having the outer surface 50a and the inner surface 50b, the drive lever 52 and the driven lever 54 that are assembled on the outer surface 50a and the inner surface 50b of the base member 50, and the rack member 56 movably disposed on the base member 50 and held in mesh with the driven lever 54 and the first shaft 40. The drive force from the actuator 20 is transmitted from the drive lever 52 to the driven lever 54 and then from the driven lever 54 through the rack member 56 to the first shaft 40.

Since the door actuating mechanism 22 is constructed as an assembly or module that includes the link mechanism 44 having the drive lever 52, the driven lever 54, and the rack member 56 and the assembly can be installed on the transverse side wall 24 of the air conditioner case 12 that is of a large size, the door actuating mechanism 22 can be assembled more easily than if the drive lever 52, the rack member 56, and other components are separately installed on the air conditioner case 12.

Furthermore, as the drive force from the actuator 20 is transmitted through the rack member 56 to the first shaft 40, the trajectories along which the drive lever 52 and the driven lever 54 move are more compact than with the conventional door actuating device in which the drive force is transmitted by only the levers including the drive lever and the driven lever. The door actuating mechanism 22 is thus reduced in size.

As a result, inasmuch as the door actuating mechanism 22 is of a simpler structure, it can be made up of a smaller number of parts, is smaller in size and weight, and can more easily be assembled than the conventional door actuating device.

Moreover, the rack member 56 is made of an elastically deformable resin material, and has the first rod gear 88 held in mesh with the first gear 46 of the first shaft 40 and the second rod gear 90 held in mesh with the link gear 80 of the driven lever 54. The base member 50 includes the two first pressers 64 and 66 protruding from the inner surface 50b toward the rack member 56. The first rod gear 88 is disposed between the first gear 46 and the first presser 64, and the second rod gear 90 is disposed between the link gear 80 and the other first presser 66.

It is thus possible for the first pressers 64 and 66 that are disposed on the rear surface 56b side of the rack member 56 to press the rack member 56 toward the first shaft 40 and the driven lever 54 reliably into mesh with the gears thereon.

In addition, the base member 50 includes the hook 70 erected from the inner surface 50b of the base member 50 and having the leg 72 protruding substantially perpendicularly toward the air conditioner case 12 and the prong 74 protruding from the leg 72 substantially parallel to the inner surface 50b. The hook 70 is elastically deformable, and the rack member 56 is disposed between the prong 74 and the air conditioner case 12. Accordingly, since the rack member 56 is reliably held between the inner surface 50b of the base member 50 and the prong 74, the rack member 56 is prevented from coming off the door actuating mechanism 22 at the time the door actuating mechanism 22 is assembled onto the air conditioner case 12.

Furthermore, the first gear 46 of the first shaft 40 and the first rod gear 88 of the rack member 56 are held in mesh with each other, and the second presser 68 on the inner surface 50b of the base member 50 is able to contact the front surface 56a of the rack member 56 that has the first rod gear 88. The hook 70 is disposed between the end of the first rod 84 of the rack member 56 and the second presser 68 in the longitudinal directions of the rack member 56.

Consequently, when the rack member 56 is to be installed on the base member 50, the rack member 56 is elastically deformed about the portion thereof that abuts against the second presser 68 so as to move over the prong 74 of the hook 70 until the prong 74 is positioned on the rear surface 56b side.

When the rack member 56 is to be installed under the base member 50 along an axial direction of the drive shaft 92 of the actuator 20, the rack member 56 is elastically deformed to move over the prong 74 of the hook 70 on the base member 50. Since the rack member 56 can thus be assembled from the same direction as the drive lever 52 and the driven lever 54, the rack member 56 can be assembled with greater ease.

In addition, inasmuch as the rack member 56 is disposed between the transverse side wall 24 of the air conditioner case 12 and the inner surface 50b of the base member 50, the rack member 56 can be sandwiched and stored between the air conditioner case 12 and the base member 50. Therefore, the rack member 56 is prevented from coming off with a simpler structure than with the conventional door actuating device whose casing is made up of two upper and lower cases. Moreover, the number of parts used is reduced as there is no need for a separate fixing means by which to fix the rack member 56 in position.

Furthermore, the guide rail 30 that protrudes toward the rack member 56 is disposed on the transverse side wall 24 of the air conditioner case 12. The guide rail 30 and the rack member 56 are held in abutment against each other, and the area SA in which the side surface 56c contacts the guide rail 30 is smaller than the entire surface area SB of the side surface 56c of the rack member 56 held against the guide rail 30.

Consequently, compared with an arrangement in which the entire side surface 56c of the rack member 56 contacts the guide rail 30, resistance to vertical sliding movement of the rack member 56 on the guide rail 30 is reduced to allow the rack member 56 to move smoothly.

Moreover, the base member 50 has the first and second shaft holes 60 and 62 into which the respective ends of the first and second shafts 40 and 42 are inserted at the time the door actuating mechanism 22 is installed on the air conditioner case 12. Therefore, the door actuating mechanism 22 can easily be positioned and installed at a desired position on the air conditioner case 12 based on the ends of the first and second shafts 40 and 42 that project from the transverse side wall 24 of the air conditioner case 12.

Although the preferred embodiment of the present invention has been described in detail above, it should be understood that the present invention is not limited to the illustrated embodiment, but various changes and modifications can be made therein without departing from the scope of the appended claims.

I claim:

1. A door actuating device comprising:
a plurality of doors disposed in a flow channel defined in an air conditioner case, the plurality of doors adjusting a degree of opening of the flow channel, the doors having respective door drive shafts; and
a link unit actuating at least two of the doors, wherein the link unit includes:
an actuator,
a plate-shaped base member,
a link mechanism having a plurality of levers mounted on the base member, and
a rack member movably disposed on a surface of the base member and movable by a drive force transmitted from the actuator via the link mechanism, the rack member being configured to move relative to the base member,
wherein the rack member is made of an elastically deformable resin material and has a toothed rack portion held in mesh with at least either one of a first toothed portion and a second toothed portion to transmit the drive force from the actuator, the first toothed portion being disposed on one of the levers and the second toothed portion being disposed on one of the door drive shafts,
the base member has a first presser protruding toward the rack member from the surface thereof on which the rack member is disposed, and
the toothed rack portion is disposed between the first presser and one of the first and second toothed portions,
wherein the toothed rack portion is disposed on the first surface of the rack member, and
the first presser is engaged with a second surface of the rack member, the second surface is located opposite to the first surface so as to press the toothed rack portion toward the first toothed portion or the second toothed portion,
wherein the link unit is attached to and mounted on the outside of the side wall of the air conditioner case,
the surface of the base member on which the rack member is disposed includes a hook having an elastic leg protruding toward the side wall of the air conditioner case and a prong protruding from the leg substantially parallel to directions in which the rack member extends, the prong being engaged with a third surface of the rack member which faces the side wall of the air conditioner case to prevent the rack member from moving away from the base member toward the side wall of the air conditioner case, and
the rack member is disposed and held between the base member and the prong.

2. The door actuating device according to claim 1, wherein
the second toothed portion of the door drive shafts and the toothed rack portion are held in mesh with each other,
the base member has a second presser protruding toward the rack member from the surface thereof on which the rack member is disposed and held in contact with a side surface of the rack member which has the toothed rack portion, and
the prong is disposed between an end of the rack member and the second presser in a. longitudinal direction of the rack member.

3. The door actuating device according to claim 2, wherein
the rack member is elastically deformed so as to move over the prong of the hook when the rack member is moved onto the base member in a direction parallel to axes of rotation of the levers.

4. The door actuating device according to claim 1, wherein
the rack member is disposed between the air conditioner case and the base member.

5. The door actuating device according to claim 4, further comprising:
a rail disposed on a surface of the air conditioner case which faces the rack member, the rail protruding toward the rack member, wherein
the rail and the rack member abut against each other, and an area in which the rail and the rack member contact each other is smaller than an area of the rack member that faces the surface of the air conditioner case facing the rack member.

6. The door actuating device according to claim 1, wherein
the base member has a plurality of insertion holes defined therein to receive the door drive shafts inserted therein when the link unit is fixed to the air conditioner case.

7. The door actuating device according to claim 1, wherein
the rack member is configured to transmit the drive force to the door drive shafts.

\* \* \* \* \*